US008965714B2

(12) United States Patent
Yamaguchi et al.

(10) Patent No.: US 8,965,714 B2
(45) Date of Patent: Feb. 24, 2015

(54) DIAGNOSTIC MECHANISM

(75) Inventors: Yuji Yamaguchi, Kyoto (JP); Masao Yamaguchi, Santa Clara, CA (US); Kentaro Nagai, Kyoto (JP); Toshiyuki Himi, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 0 days.

(21) Appl. No.: 13/250,602

(22) Filed: Sep. 30, 2011

(65) Prior Publication Data
US 2012/0080104 A1    Apr. 5, 2012

(30) Foreign Application Priority Data

Sep. 30, 2010    (JP) .................................. 2010-220722
Apr. 28, 2011    (JP) .................................. 2011-101924

(51) Int. Cl.
*G01F 5/00*    (2006.01)
*G05D 7/06*    (2006.01)
*G01F 25/00*    (2006.01)
*G01F 1/684*    (2006.01)

(52) U.S. Cl.
CPC .......... *G05D 7/0635* (2013.01); *G01F 25/0007* (2013.01); *G01F 1/6847* (2013.01); *G01F 5/00* (2013.01); *G01F 5/005* (2013.01)
USPC .......................................................... 702/45

(58) Field of Classification Search
CPC ......... G01F 5/00; G01F 5/005; G05D 7/0617; G05D 7/0623; G05D 7/0676
USPC .......................................... 702/45; 137/559
See application file for complete search history.

(56) References Cited

U.S. PATENT DOCUMENTS

| 6,125,869 A | * | 10/2000 | Horiuchi ........................... 137/1 |
| 2006/0011237 A1 | * | 1/2006 | Tison et al. ................. 137/487.5 |
| 2007/0233412 A1 | * | 10/2007 | Gotoh et al. ................... 702/100 |
| 2010/0070240 A1 | | 3/2010 | Yasuda et al. |
| 2010/0200083 A1 | * | 8/2010 | Kouchi et al. ................. 137/486 |

FOREIGN PATENT DOCUMENTS

| JP | 06119059 | 4/1994 |
| JP | 06214657 | 8/1994 |
| JP | 072181760 | 10/1995 |
| JP | 07306084 | 11/1995 |
| JP | 11294631 | 10/1999 |
| JP | 2008170410 | 7/2008 |
| JP | 2009277240 | 11/2009 |
| WO | 2008/053839 A1 | 5/2008 |

* cited by examiner

*Primary Examiner* — Janet Suglo
*Assistant Examiner* — Michael Dalbo
(74) *Attorney, Agent, or Firm* — Alleman Hall McCoy Russell & Tuttle LLP

(57) ABSTRACT

A diagnostic mechanism includes: a flow rate control part configured to control an opening degree of a flow rate control valve provided in a flow passage so that a measurement flow rate value outputted from a flow rate sensor becomes a target flow rate value; an inspection value output part configured to output an inspection value related to a time integral of the measurement flow rate value in a diagnostic period which is defined in correspondence with a part of a period from a time point of closing the flow passage upstream of the flow rate sensor to a time point of expiration of a state that the measurement flow rate value and the target flow rate value are substantially nearly equal; and a diagnosing part configured to compare the inspection value and a predetermined specified value to diagnose whether an abnormality relating to the flow rate sensor is present.

13 Claims, 10 Drawing Sheets

(a) IN CASE OF NO CLOGGING PRESENT (b) IN CASE OF SENSOR FLOW PASSAGE BEING CLOGGED (c) IN CASE OF MAIN FLOW PASSAGE BEING CLOGGED (a) EXAMPLE OF OPERATION SCHEDULE OF MASS FLOW CONTROLLER (b) VARIATION OF EACH VALUE IN NORMAL CONDITION (a) VARIATION OF EACH VALUE IN CASE OF SENSOR FLOW PASSAGE BEING CLOGGED (b) VARIATION OF EACH VALUE IN CASE OF MAIN FLOW PASSAGE BEING CLOGGED

OPEN

CLOSE (a) PURGING TIME WITH NITROGEN GAS (b) DIAGNOSING TIME

DIAGNOSTIC MECHANISM

TECHNICAL FIELD

The present invention relates to a diagnostic mechanism for diagnosing presence or absence of abnormality regarding a mass flow controller and a flow rate sensor, etc. for performing a flow rate control of fluids such as liquids and gases in a semiconductor process and the like.

BACKGROUND ART

Conventionally, in a pressure type mass flow controller, there is a case where, for example, particles contained in a fluid may cause a clogging in a differential pressure generating unit such as a nozzle and an orifice so that it becomes impossible to perform a fluid control as is intended to obtain a targeted flow rate value. To prevent such a defect, there has been known a diagnostic mechanism in which a mass flow controller per se can conduct a self-diagnosis whether or not there is a clogging in a flow passage and differential pressure generating unit, as mentioned above, in which a fluid flows.

For example, the diagnostic mechanism is adapted to fully close a flow rate control valve inside the mass flow controller or an on-off valve separately provided so as not to feed a new fluid into the mass flow controller from a primary side. In this state, as shown in a graph of FIG. 10, a pressure drop amount of a fluid and a time required for the pressure drop due to an outflow of the fluid from the inside of the mass flow controller are measured so as to be compared to specified values measured in a normal condition where there is no clogging. More specifically, in a state that the fluid supply from the primary side is interrupted and the flow rate control is not performed by the flow rate control valve, there occurs a pressure drop as shown by a solid line in the graph when in a normal condition. Whereas, in the case where there is a clogging in a flow passage, etc., as shown by a dotted line in the graph, the pressure drop is made slower than that in the normal condition and the time required for lowering to a certain pressure value is changed. The diagnostic mechanism is adapted to have a configuration that performs a diagnosis whether or not a clogging exists within the flow passage and the like.

CITATION LIST

Patent Literature

Patent Literature 1: WO 2008-053839

SUMMARY OF INVENTION

Technical Problem

By the way, in a diagnosing method of a mass flow controller and a flow rate sensor as mentioned above, in order to appropriately detect an abnormality of a flow passage, etc., it is necessary for a tester to appropriately establish various kinds of parameters such as, e.g., which of a pressure drop amount and a pressure drop time should be paid attention to and at what time a start time and an end time of a diagnostic period should be set.

As described above, since the parameters to be set by the tester are too many, upon beginning to take into consideration differences of, e.g., various kinds of component equipment and configurations of flow passages, diagnostic algorithms are soon complicated and this results in that the diagnosing method becomes hard to use in an actual field of executing a diagnosis.

Therefore, the present invention has been made in consideration of the problems as described above, and an object thereof is to provide a diagnostic mechanism capable of accurately diagnosing an abnormality of a measurement flow rate value of a flow rate sensor and a cause thereof while simplifying diagnostic algorithms.

Solution to Problem

That is, the diagnostic mechanism of the present invention is adapted to diagnose an abnormality relating to a flow rate sensor for measuring a flow rate of a fluid flowing in a flow passage, wherein the diagnostic mechanism includes: a flow rate control part configured to control an opening degree of a flow rate control valve provided in the flow passage so that a measurement flow rate value outputted from the flow rate sensor becomes a target flow rate value; an inspection value output part configured to output an inspection value related to a time integral of the measurement flow rate value in a diagnostic period which is defined in correspondence with at least a part of a period from a time point of closing the flow passage upstream of the flow rate sensor to a time point of expiration of a state that the measurement flow rate value and the target flow rate value are substantially nearly equal; and a diagnosing part configured to compare the inspection value and a predetermined specified value so as to diagnose whether an abnormality relating to the flow rate sensor is present or not.

Herein, the state that the measurement flow rate value and the target flow rate value are substantially nearly equal means that, even if there is a difference between the measurement flow rate value and the target flow rate value, the difference is so small as to be negligible or undetectable.

With this configuration, since the diagnostic period is defined in correspondence with at least a part of a period from a time point of closing the flow passage upstream of the flow rate sensor to a time point of ending a state that the measurement flow rate value and the target flow rate value are substantially nearly equal, it is not necessary for a tester to set the parameters again and the diagnostic algorithms can be simplified. Moreover, since only the period of the measurement flow rate value following the target flow rate value after closing the flow passage is defined as the diagnostic period, the inspection value contains both an error in the measurement flow rate value and an error in the flow rate value of the fluid actually flowing in the flow passage so that the diagnosing accuracy can be improved. In addition, for example, the diagnostic period may be also started from a time point of closing the flow passage, and in this case, a waiting time for starting the diagnosis can be eliminated so that a diagnosed result can be obtained more quickly.

By the way, in case of using a thermal flow rate sensor, there is formed a sensor flow passage which branches from a main flow passage and joins the main flow passage again for measuring a flow rate so that the fluid is diverted from the main flow passage to the sensor flow passage at a predetermined ratio. Therefore, a clogging may possibly occur either in the main flow passage or the sensor flow passage, and it is desired to diagnose not only whether a clogging is present merely but also in which of the flow passages the clogging is present in some cases.

For example, in the adaptation of the diagnostic mechanism of the present invention, in the case where the flow passage includes a main flow passage and a sensor flow passage which branches from the main flow passage and joins the main flow passage again and the flow rate sensor is a thermal flow rate sensor which is provided with a flow rate measuring mechanism in the sensor flow passage for measuring a flow rate of the fluid, only a period of performing the flow rate control by the flow rate control valve is defined as the diagnostic period, and therefore not only the error in the flow rate value of the fluid actually flowing in the main flow passage but also the error in the measurement flow rate value due to a clogging in the sensor flow passage can be reflected by the inspection value so that it becomes possible to decide which of the flow passages is clogged, based on the inspection value.

More specifically, in the case where the main flow passage is clogged, the actual flow rate of the fluid passing through the flow rate control valve becomes smaller than the measurement flow rate value even though the measurement flow rate value and the target flow rate value are in agreement, and therefore the diagnostic period becomes longer than that in the normal condition. As a result, since the time-integral value of the measurement flow rate value in the diagnostic period becomes larger than that in the normal condition, the inspection value also becomes larger.

On the other hand, in the case where the sensor flow passage is clogged, since there occurs an error in the measurement flow rate value, the measurement flow rate value indicates a smaller value compared to an actual flow rate of the fluid flowing in the main flow passage, and therefore the actual flow rate value of the fluid passing through the flow rate control valve becomes larger than the measurement flow rate value even though the target flow rate value and the measurement flow rate value are in agreement, and therefore the diagnostic period becomes shorter than that in the normal condition. As a result, since the time-integral value of the measurement flow rate value in the diagnostic period becomes smaller than that in the normal condition, the inspection value also becomes smaller.

Thus, since the inspection value in the case of the main flow passage being clogged is larger than that in the case of the sensor flow passage being clogged, it is possible to diagnose in which of the flow passages a clogging occurs by previously determining a specified value which is an intermediate value between the respective inspection values.

Meanwhile, even if the flow rate sensor is a differential pressure type flow rate sensor, it is possible to accurately diagnose whether or not an abnormality is present with use of simple algorithms by the diagnostic mechanism of the present invention.

In order to be hardly affected by a state of the fluid prior to the diagnostic period such as, e.g., a pressure value or a target flow rate value and to accurately diagnose a clogging, it is sufficient that the inspection value may be a flow rate integration value obtained by time-integrating the measurement flow rate value during the diagnostic period.

As another aspect of the inspection value, the inspection value may be a length of the diagnostic period. Even in this case, for example, by unifying the target flow rate values in the case of diagnosing to be the same value, it becomes substantially the same as the case of evaluating the flow rate integration value so that a similar resultant value can be obtained.

As a specific embodiment for determining whether or not the diagnostic period expires, there may be exemplified that the inspection value output part is configured to detect the end point of the diagnostic period based on an error between the measurement flow rate value and the target flow rate value.

As another specific embodiment of detecting the end point of the diagnostic period, the flow rate control part is exemplified such that the inspection value output part is configured to detect the end point of the diagnostic period based on the fact that the opening degree of the flow rate control valve becomes a full opening or a predetermined opening degree of the diagnosis expiration.

As one specific aspect for determining the diagnostic period, there is exemplified that the opening degree of the diagnosis expiration is an opening degree smaller than the full-opening degree of the flow rate control valve by a predetermined amount and that the inspection value output part detects the end point of the diagnostic period based on the opening degree of the flow rate control valve. By setting like this, it is not necessary to wait until the flow rate control becomes completely incapable of performing the flow rate control for diagnosing. Moreover, even though there is no remarkable change in the value of the flow rate sensor due to a state in which the flow rate control is remaining, since the opening degree of the flow rate control valve per se is used as a trigger, the diagnosis expiration point can be surely detected.

In order that the flow rate of the fluid is substantially maintained to be a target flow rate in the flow passage by controlling the flow rate control valve by the flow rate control part so as to be able to diagnose whether an abnormality of the flow rate sensor is present or not without interruption of the flow rate control, it is sufficient that the inspection value output part is adapted to be able to control the opening and closing of the on-off valve provided upstream of the flow rate sensor and that the inspection value output part is adapted to release the on-off valve provided upstream of the flow rate sensor at the time when the opening degree of the flow rate control valve becomes the opening degree of the diagnosis expiration. By this way, since the opening degree of the diagnosis expiration is smaller than that of the full-opening and a new fluid flows in soon at the time of expiration of the diagnostic period, the flow rate control can be kept continuous. That is, even if the diagnostic period is defined in use for actually performing the flow rate control rather than an interval of such as replacement of a set-up, the diagnosis can be performed while a normal flow rate control is continuously maintained, and it becomes possible to perform a so-called real-time diagnosis.

As a specific configuration for diagnosing which flow passage is clogged, it is sufficient that the diagnosing part is configured such that, in the case where the inspection value is larger than the specified value, the diagnosing part diagnoses that an abnormality is present due to clogging of the main flow passage, and in the case where the inspection value is smaller than the specified value, the diagnosing part diagnoses that an abnormality is present due to clogging of the sensor flow passage.

In order to reduce an influence on the flow rate measurement due to a pressure reduction in the diagnostic period so as to evaluate a clogging with high accuracy, it is sufficient that a pressure sensor is further provided for measuring the pressure of the fluid and outputting the measurement pressure value and that the inspection value output part is merely configured to correct the inspection value (or correct the measurement flow rate value) based on the measurement pressure value. With this configuration, for example, it is possible to reduce an influence due to a change of the pressure value in the diagnostic period and the diagnosis can be accurately performed as to whether a clogging is present or not and in which of the passages the clogging occurs.

In order to eliminate the need to unify the temperatures during the diagnostic period and make it possible to accurately diagnose a clogging, it is sufficient that a temperature sensor is further provided for measuring the temperature of the fluid and outputting the measurement value of the temperature and that the inspection value output part is merely configured to correct the inspection value based on the measurement value of the temperature.

As the specified value, there is exemplified a value as a specific value for making the diagnosis more accurate that is the inspection value outputted by the inspection value output part when the measurement output value of the thermal flow rate sensor is normal.

Advantageous Effects of Invention

Thus, according to the diagnostic mechanism of the present invention, it is possible to accurately perform a diagnosis of an abnormality of the flow rate sensor and the flow passage with simple algorithms. Particularly, in the case of such as a thermal flow rate sensor provided in the main flow passage and the sensor passage, since the diagnostic period is set to be the period in which the flow rate control can be performed by the flow rate control valve after closing the main flow passage and a value related to a time integral of the measurement flow rate value in the diagnostic period, it is possible to render an influence of a clogging present in the main flow passage to appear toward an increment of the inspection value and an influence of a clogging present in the sensor flow passage to appear toward a decrement of the inspection value. Therefore, since the cloggings of the respective flow passages appear in directions reverse to each other, it is possible to diagnose in which of the flow passages the clogging occurs.

DESCRIPTION OF EMBODIMENTS

The following describes one embodiment of the present invention referring to the accompanying drawings.

Figure 1:
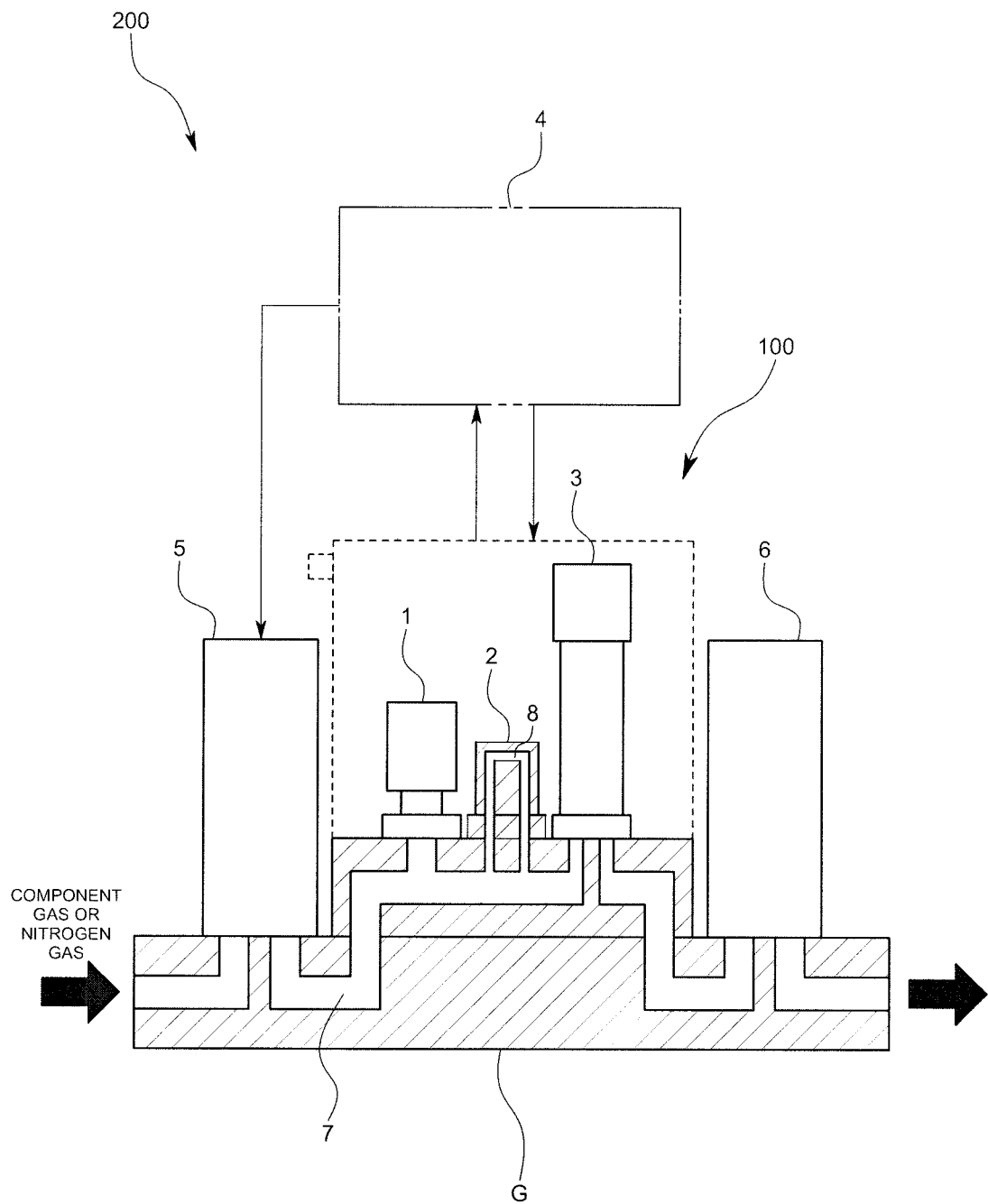
FIG. 1 is a schematic diagram showing a diagnostic mechanism according to one embodiment of the present invention.

A diagnostic mechanism 200 according to the present embodiment is configured using components of a mass flow controller 100 adapted to control flow rates of various component gases in a semiconductor manufacturing process as shown in FIG. 1. The mass flow controller 100 is a so-called thermal mass flow controller 100 using a thermal flow rate sensor 2. As shown in FIG. 1, in order to configure the diagnostic mechanism 200, a first on-off valve 5, the thermal mass flow controller 100 and a second on-off valve 6 are provided in this order along a main flow passage 7 from an upstream side to which a component gas and nitrogen gas are introduced. Further, each of the on-off valves and the mass flow controller 100 are connected by piping with a plate-shaped member called a gas panel G. The gas panel G is a plate-shaped member having connection ports formed on a face plate part thereof and formed with a cavity inside the plate for communicating each of the connection ports to thereby form a part of the main flow passage 7.

The thermal mass flow controller 100 is provided with a pressure sensor 1, a thermal flow rate sensor 2 and a flow rate control valve 3 along the main flow passage 7 in this order from the upstream, and these units are accommodated in a casing to be packaged as one unit of fluid control equipment. Further, the casing includes a control mechanism 4 for performing various kinds of controls such as operations for diagnosing an abnormality in the mass flow controller 100 and a control of the flow rate control valve 3 and so forth.

The pressure sensor 1 is adapted to measure a pressure of a fluid flowing in the main flow passage 7 so as to output the measurement pressure value thereof which is supplied to the control mechanism 4.

Figure 2:
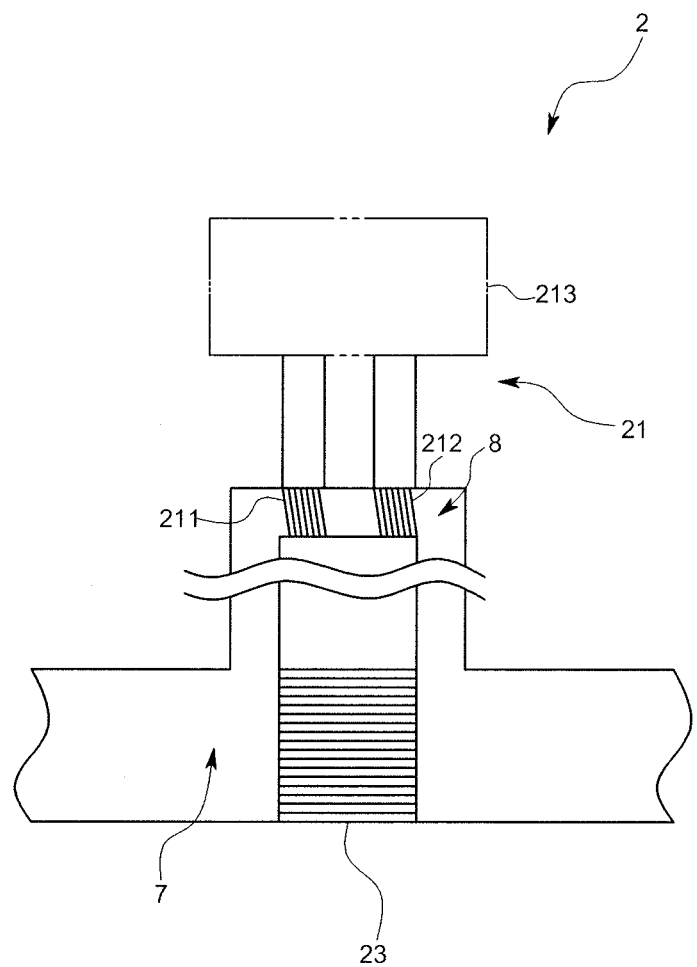
FIG. 2 is a schematically enlarged view of a thermal flow rate sensor and a sensor flow passage in the same embodiment.

As shown in the enlarged view of FIG. 2, the thermal flow rate sensor 2 includes a sensor flow passage 8 which is formed to be branched from the main flow passage 7 and join the main flow passage 7 again, a flow rate measuring mechanism 21 for measuring the flow rate provided in the sensor flow passage 8 and a laminar flow element 23 provided in the main flow passage 7 between the branched point and the joining point of the sensor flow passage 8. Thus, it is configured to be able to measure the entire flow rate by measuring a part of the fluid flowing in the main flow passage 7 in the sensor flow passage 8. In the present embodiment, although the thermal flow rate sensor 2 is adapted to measure a mass flow rate, it may be configured to output a volumetric flow rate.

The sensor flow passage 8 is formed by providing a generally U-shaped hollow tubing standing on a pipe configuring the main flow passage 7.

The flow rate measuring mechanism 21 includes an upstream coil 211 and a downstream coil 212 which are formed by winding two heat-sensitive resistors in a coiled state provided outside the hollow tubing, and a flow rate calculation part 213 for calculating a flow rate of the flowing fluid based on the outputs of the upstream coil 211 and the downstream coil 212.

Specifically, the hollow tubing is heated by the heat-sensitive resistor and when the fluid is not flowing, the temperature distribution thereof is symmetric with respect to the center of the hollow tubing. In contrast, when the fluid is flowing in the hollow tubing, since the fluid heated by the upstream coil 211 flows into the downstream coil 212, the temperature thereof becomes higher compared to the temperature of the upstream coil 211 and therefore there arises a temperature difference between the upstream coil 211 and the downstream coil 212 so that the temperature distribution becomes asymmetric. The flow rate calculation part 213 is so configured as to be able to measure the mass flow rate using a specific relationship that is viable between the temperature difference at this time and the mass flow rate of the fluid.

As the laminar element 23, that is formed by inserting a plurality of tubings inside an outer pipe or that is formed by laminating a plurality of thin circular plates each having multiple through holes formed therein and it is intended to have a prescribed design value of a diverting ratio between the main flow passage 7 and the sensor flow passage 8.

The flow rate control valve 3 is configured to have an opening degree which is variable in a range of 0% (full-closing) to 100% (full-opening) and it is feedback-controlled by the control mechanism 4.

Figure 3:
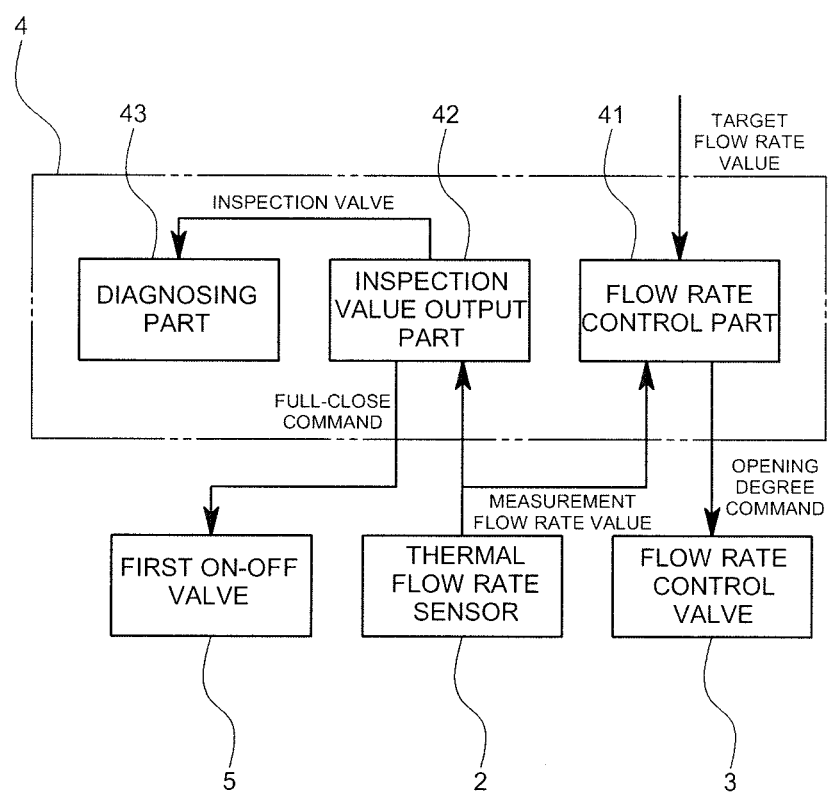
FIG. 3 is a functional block diagram showing a configuration of a control mechanism in the same embodiment.

The control mechanism 4 is a so-called computing device including a CPU, memory, I/O channel, AD converter and the like, and has functions of at least a flow rate control part 41, an inspection value output part 42 and a diagnosing part 43 as shown in the functional block diagram of FIG. 3.

The flow rate control part 41 is adapted to control the opening degree of the flow rate control valve 3 so that the measurement flow rate value outputted by the thermal flow rate sensor 2 becomes a target flow rate value. The flow rate control part 41 is so configured as to continue the control of the opening degree of the flow rate control valve 3 so that an error between the measurement flow rate value and the target flow rate value becomes zero even in a diagnostic period to be described later.

The inspection value output part 42 is so configured as to output an inspection value which is related to a time integral of the measurement flow rate value in the diagnostic period wherein at least a part of a period from a time point of closing the main flow passage 7 upstream of the thermal flow rate sensor 2 and the flow rate control valve 3 to a time point of expiration of the state that the measurement flow rate value is substantially nearly equal to the target flow rate value is used as the diagnostic period. In the present embodiment, the opening degree of the diagnosis expiration is set to a full-opening degree and the diagnostic period is established so that the diagnostic period starts at a time point when the first on-off valve 5 is fully opened and expires at a time point when the error between the measurement flow rate value and the target flow rate value is not zero (at a time when these values become unequal). Moreover, the inspection value is shown by using a shaded area in the graph of FIG. 4, using an integration value of the flow rate which is a time integral of the measurement flow rate in the diagnostic period. Herein, as a calculating method of the time integral, it may be carried out just as a definition of the integration or it may be calculated by multiplying the measurement flow rate value by a time in consideration of the fact that the time integral is an area of the rectangle.

The diagnosing part 43 is adapted to diagnose whether an abnormality related to the thermal flow rate sensor 2 is present or absent by comparing the inspection value with a predetermined specific value. The specific value is a flow rate integration value which has been previously measured in a state that there exists no clogging in the main flow passage 7 and the sensor flow passage 8. More specifically, the diagnosing part 43 is so configured as to diagnose that an abnormality is caused by a clogging in the main flow passage 7 in the case where the inspection value is larger than the predetermined value and diagnose that an abnormality is caused by a clogging in the sensor flow passage 8 in the case where the flow rate integration value is smaller than the predetermined value.

Figure 5:
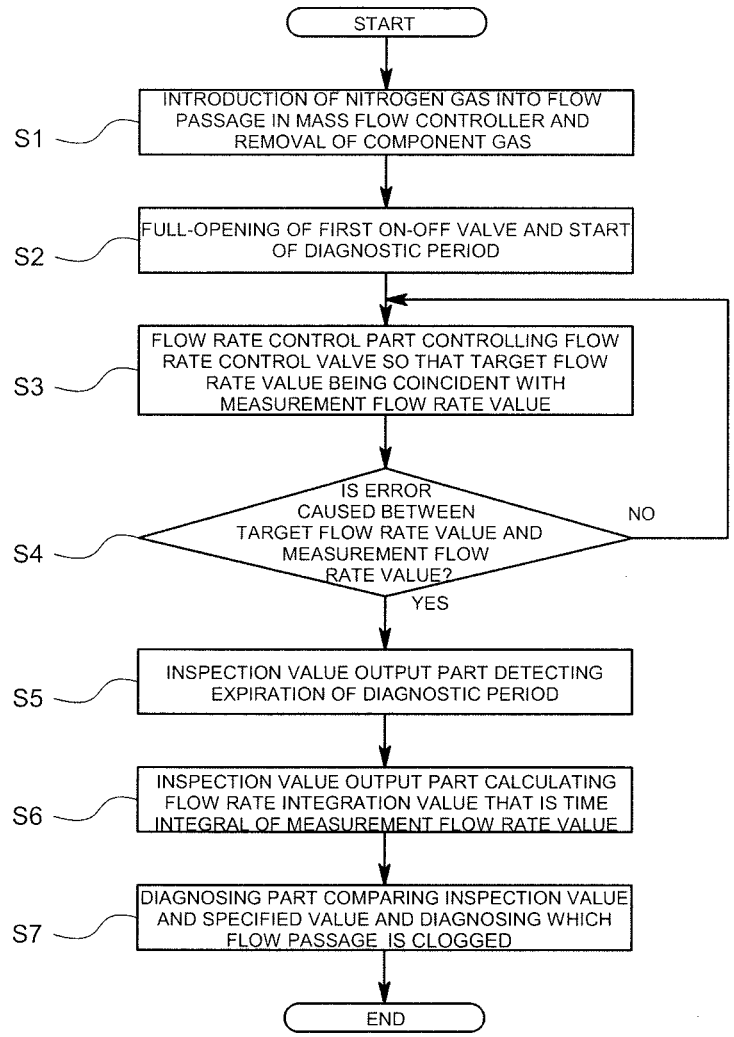
FIG. 5 is a flow chart showing a flow at the time of diagnosis in the same embodiment.

Next, an operation when performing a self-diagnosis as to whether there is a clogging in the main flow passage 7 and the sensor flow passage 8 is described below referring to the flow chart in FIG. 5. Herein, the diagnosing method may be carried out between cycles, or takts. Thus, the diagnosing method may be carried out between a first cycle, or takt and a second cycle, or takt, which occur at a cycle time required to keep a component gas flowing at a predetermined flow rate into, e.g., a semiconductor manufacturing apparatus. In this manner, the method of performing a diagnosis of the flow rate sensor may be performed in a period where the flow rate control is able to be interrupted without adverse effect due to the diagnosis.

First, in order to ensure that no component gas, etc. remains in the mass flow controller 100, the component gas is purged by introducing a nitrogen gas at a prescribed flow rate (Step S1). At this time, a target flow rate value is set so that the flow rate control valve 3 of the mass flow controller 100 is transferred to a state of predetermined opening degree from the fully closed state. The target flow rate value at the time of purging is set to be larger than the target flow rate value in the diagnostic period to be described later, and a sufficient amount of the nitrogen gas for purging and diagnosing is introduced into the thermal mass flow controller 100.

Figure 4:
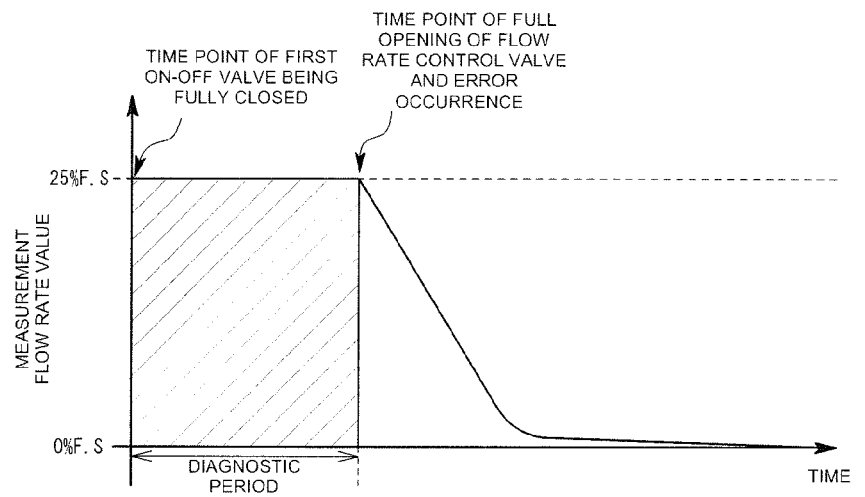
FIG. 4 is a schematic graph diagram showing a change with time lapse of the measurement flow rate value at the time of diagnosis in the same embodiment.
Figure 4:
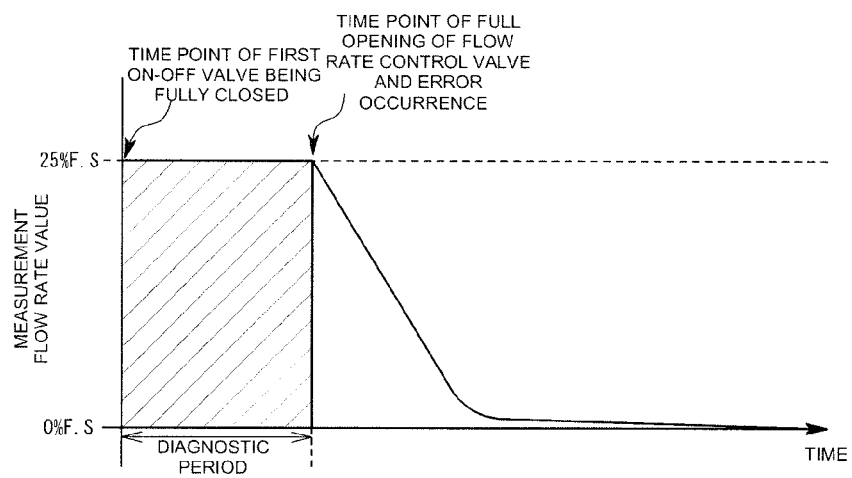
Figure 4:
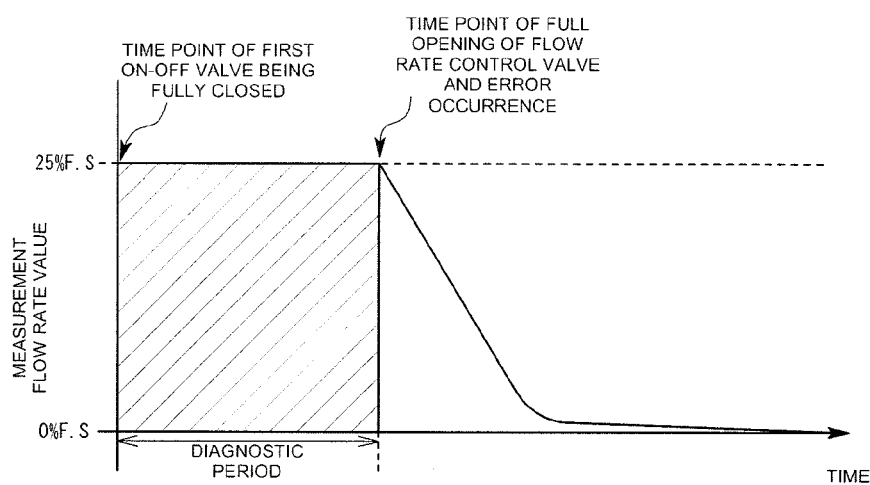

Subsequently, the inspection value output part 42 supplies a full-closing command to the first on-off valve 5 and stores a time point of this as a starting point of the diagnostic period (Step S2). The flow rate control part 41 changes the target flow rate value to a specified flow rate value previously determined in the diagnostic period so as to control the opening degree of the flow rate control valve 3 so that the target flow rate value and the measurement flow rate value are kept to be coincident (Step S3). Moreover, the target flow rate value is set to be smaller than the target flow rate value at the time of purging so that the opening degree of the flow rate control valve is smaller than that at the time of purging with the nitrogen gas in Step S1. Herein, although the order of Step S2 and Step S3 may be reversed, since the fluid to be controlled is only the fluid existing between the first on-off valve 5 and the flow rate control valve 3 at the time of fully closing the first on-off valve 5, the pressure thereof is lowered as much as an outflow amount of the fluid with time lapse. Therefore, in order to maintain the measurement flow rate value to be constant in the same manner as the target flow rate value, the flow rate control part 41 is rendered to control the opening degree of the flow rate control valve 3 progressively largely. Eventually, since the opening degree of the flow rate control valve 3 becomes the full opening (100%), the flow rate control of the fluid cannot be performed thereafter, and the flow rate is reduced to be zero as shown in the graph of FIG. 4. That is, since there arises an error (of not being zero) between the target flow rate value and the measurement flow rate value at the time of the opening degree of the flow rate control valve 3 being in the full opening state (Step S4), the inspection value output part 42 detects the expiration of the diagnostic period at the time of occurrence of the error and stores the length of the period (elapsed time) (Step S5).

Then, the inspection value output part 42 calculates a flow rate integration value which is an integration value of the measurement flow rate value during the diagnostic period and outputs the calculated value as the inspection value which is supplied to the diagnosing part 43 (Step S6).

The diagnosing part 43 compares the flow rate integration value which is the calculated inspection value with the specified value of the flow rate integration value at the time of normal condition so as to diagnose based on the comparison result as to which of the main flow passage 7 or the sensor flow passage 8 is clogged (Step S7). Specifically, in the case where the inspection value is smaller than the specified value, it is determined that the sensor flow passage 8 is clogged, and in the case where the inspection value is larger than the specified value, it is diagnosed that the main flow passage 7 is clogged. In addition, in the case where the inspection value is substantially equal to the normal value, it is diagnosed that there occurs no clogging in any of the passages.

Herein, the following describes the reason why it is possible to diagnose which of the sensor flow passage 8 or the main flow passage 7 is clogged based on the comparison result of the inspection value.

In the case where the sensor flow passage 8 is clogged and the main flow passage 7 is not clogged, the diverting ratio does not become a predetermined ratio and the flow rate of the fluid flowing in the sensor flow passage 8 is reduced, and therefore the measurement flow rate indicates a value smaller than the flow rate of the actually flowing fluid. Then, if the flow rate control valve 3 is controlled so that the measurement flow rate value is made coincident with the target flow rate value, this results in that the fluid actually continues to flow out at a flow rate larger than the target flow rate value. Therefore, the consumption amount per a unit time of the fluid existing between the first on-off valve 5 and the flow rate control valve 3 in the diagnostic period becomes larger compared to the case of no error present in the measurement flow rate value and therefore the diagnostic period is also reduced. Hence, as shown in FIG. 4(b), even though the measurement flow rate value is equal to the normal value, since the diagnostic period is reduced, in the case where the sensor flow passage 8 is clogged, the flow rate integration value becomes smaller than the normal value.

Whereas, in the case where the main flow passage 7 is clogged and the sensor flow passage 8 is not clogged, since only the main flow passage 7 becomes hard for the fluid to flow therein, it results in that the measurement flow rate value indicates a value larger than the flow rate of the fluid actually flowing. Therefore, even if the measurement flow rate value is kept to be coincident with the target flow rate value, since the flow rate of the fluid actually flowing out of the flow rate control valve 3 becomes smaller than the normal flow rate, the diagnostic period is prolonged, conversely. Thus, in consideration of the manner similarly to the above case, in the case where the main flow passage 7 is clogged, it is found that the flow rate integration value becomes larger than the normal value as shown in FIG. 4(c).

As described above, according to the diagnostic mechanism 200 for use in a self-diagnosis of the thermal mass flow controller 100 of the present embodiment, it is possible to diagnose not only whether a clogging is present or not but also which of the main flow passage 7 or the sensor flow passage 8 is clogged.

Another embodiment will be described below.

The present embodiment is intended to make it possible to diagnose the flow rate sensor 2 in real time while the flow rate control is maintained without interruption. More specifically, although the hardware configuration is substantially the same as that shown in FIG. 1, since the configuration of the control mechanism 4 is modified, the setting of the opening degree of the diagnosis expiration and the configuration of the inspection value output part 42 are slightly different.

That is, the opening degree of the diagnosis expiration is set to be smaller than the full opening degree of the flow rate control valve 3 by a predetermined amount, for example, set to be 80%, etc. of the opening degree with respect to the full opening degree. Herein, any opening degree may be set as the opening degree of the diagnosis expiration so long as the diagnostic period can be long enough.

Moreover, the inspection value output part 42 is so configured as to be able to perform an on-off control of the first on-off valve 5 which is provided upstream of the mass flow controller 100 and the first on-off valve 5 is released when the opening degree of the flow rate control valve 3 becomes the opening degree of the diagnosis expiration.

The following describes an operation at the time of performing a diagnosis in the diagnostic mechanism 200 configured as described above.

Figure 6:
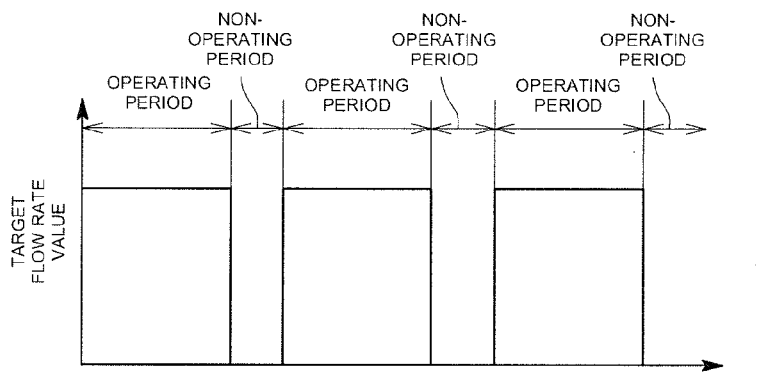
FIG. 6 is a schematic graph view showing an operation in the diagnostic mechanism according to another embodiment of the present invention.
Figure 6:
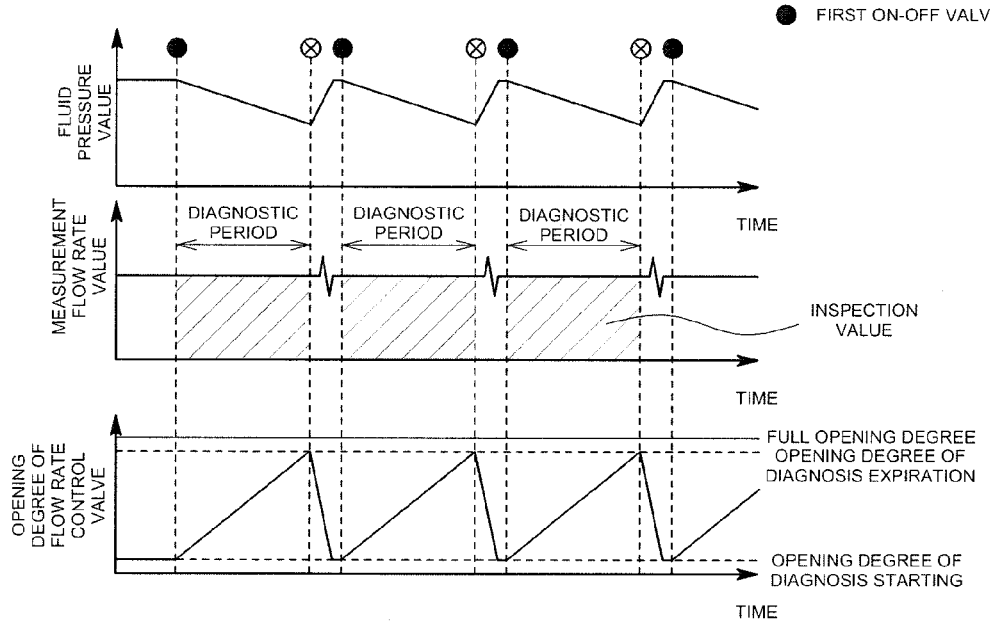

As shown in FIG. 6(a), in the case where the mass flow controller 100 is used in a semiconductor manufacturing process, etc., since a replacement of a set-up is carried out for changing gas species in accordance with a manufacturing schedule, operating periods and non-operating periods may be possibly repeated alternately for each manufacturing of a lot. In the diagnosing method of the embodiment mentioned above, since it is necessary to wait until the target flow rate value and the measurement flow rate value are alienated from each other, the diagnosis has to be performed during the non-operating period so as not to adversely affect the manufactured products. However, if the diagnosis of the flow rate sensor 2 is performed every non-operating period, the non-operating period becomes long and there is an aspect that a takt time becomes long. Also, since the diagnosis is performed after finishing a manufacturing of a certain lot, if an abnormality of the flow rate sensor is found in a certain non-operating period, all of the lots manufactured during the immediately preceding operating period may be possibly defective and it is necessary to discard each of the lots.

In contrast, according to the diagnosing method of the present embodiment, it is intended that the diagnosis of the flow rate sensor 2 can be executed in real time during the operating period and also the flow rate control can be executed. Specifically, as shown in FIG. 6(b), during the operating period, the inspection value output part 42 first closes the first on-off valve 5 and starts the diagnosis of the flow rate sensor. Then, since a new fluid does not flow into the mass flow controller 100 from the upstream, the pressure value is lowered. Since the inflow flow rate is lowered, the flow rate control part 41 increases the opening degree of the flow rate control valve 3 so as to allow the measurement flow rate value to follow the target flow rate value. Then, the inspection value output part 42 expires the diagnostic period at the time point when the opening degree of the flow rate control valve 3 becomes the predetermined opening degree of the diagnosis expiration and calculates the integration value of the measurement flow rate value in the corresponding diagnostic period as the inspection value. Further, at the time of expiration of the diagnostic period, the inspection value output part 42 releases the first on-off valve 5 so as to allow a new fluid to flow into the mass flow controller 100 again. Then, since the pressure value is raised again by the inflow of the new fluid and the flow rate of the inflow increases, the flow rate control part 41 accordingly varies the opening degree of the flow rate control valve 3 to be smaller than the opening degree of the diagnosis expiration so as to allow the measurement flow rate value to follow the target flow rate value. Then, at the time point of the opening degree of the flow rate control valve 3 being coincident with the predetermined opening degree of the diagnosis start, the inspection value output part 42 closes the first on-off valve 5 and stores this time point as the starting point of the diagnostic period. After that, by repeating the operation described above, the inspection value output part 42 accordingly repeats the calculation of the inspection value while maintaining the flow rate control so as to allow the measurement flow rate value to substantially follow the target flow rate value. In addition, every time a new inspection value is outputted from the inspection value output part 42, the diagnosing part 43 compares the new inspection value with the predetermined specified value so as to determine whether an abnormality of the flow rate sensor 2 is present or absent. Thus, during the operating period, the diagnosis of the flow rate sensor 2 can be repeated while maintaining the flow at the target flow rate all the time in the case of the normal condition.

Figure 7:
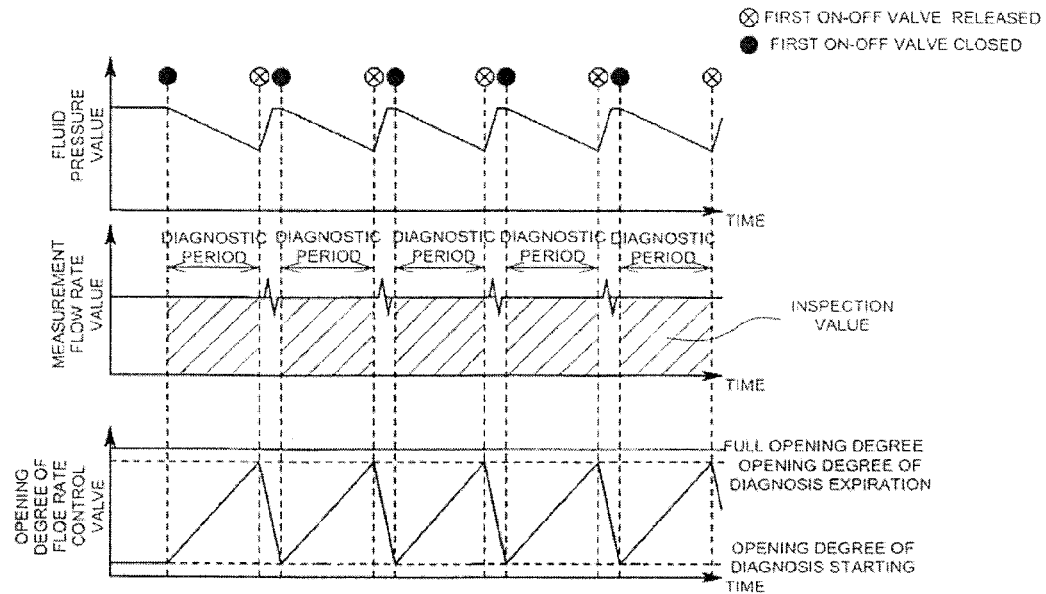
FIG. 7 is a schematic graph view showing a change of an inspection value at an abnormal time in the same embodiment shown in FIG. 6.
Figure 7:
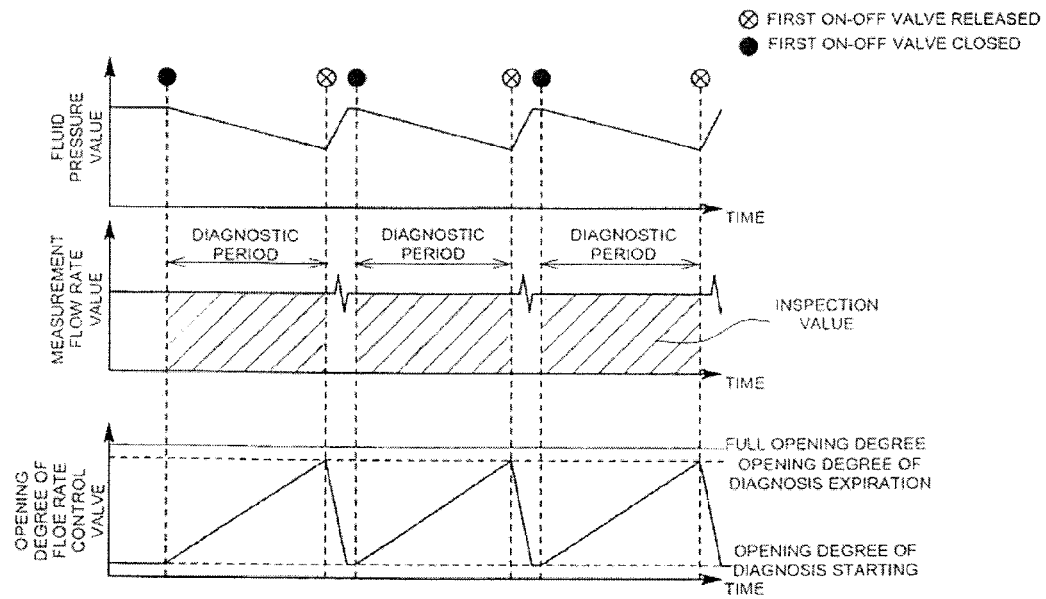

In addition, for the same reason as in the preceding embodiment, also in the present embodiment, it is possible to determine which of the flow passages is clogged. Specifically, as shown in FIG. 7(a), in the case where a clogging exists in the sensor flow passage 8, the diagnostic period is reduced so that the inspection value to be outputted becomes smaller than the specified value. Whereas, as shown in FIG. 7(b), in the case where a clog exists in the main flow passage 7, the diagnostic period is increased so that the inspection value to be outputted becomes larger than the specified value. Therefore, the diagnosing part 43 can diagnose an abnormality of the flow rate sensor 2, especially as to which of the passages arises an abnormality even during the operating period.

With the diagnostic mechanism 200 of the present embodiment, it is possible to always monitor whether or not the flow rate sensor 2 is normal all the time during the operating period, and the manufacturing of a semiconductor can be stopped at the moment of occurrence of an abnormality. Therefore, in contrast to the preceding embodiment, according to the present embodiment, in the case of performing a diagnosis in the non-operating period, a part of the lots manufactured until the abnormality occurs can be used as it is in the subsequent processes, without discarding all of the lots manufactured in the immediately proceeding operating period.

Other embodiments will be described below.

In the above embodiment, although the on-off valve for fully closing provided immediately before the mass flow controller 100 is used for performing a diagnosis, by fully closing the on-off valve, etc. provided on the other piping, a new fluid can be prevented from flowing into the mass flow controller 100 so that the diagnosis may be started.

Figure 8:
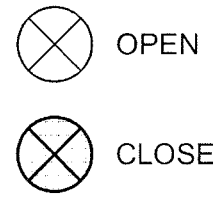
FIG. 8 is a schematic diagram showing an application example of a diagnostic mechanism according to another embodiment of the present invention.
Figure 8:
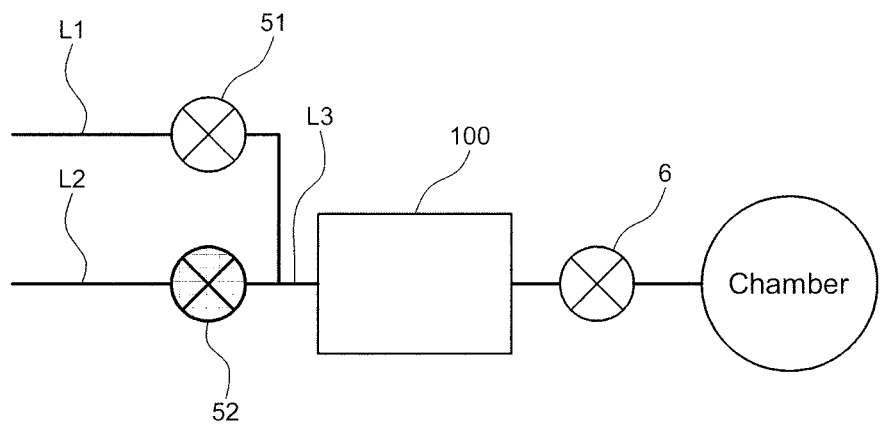
Figure 8:
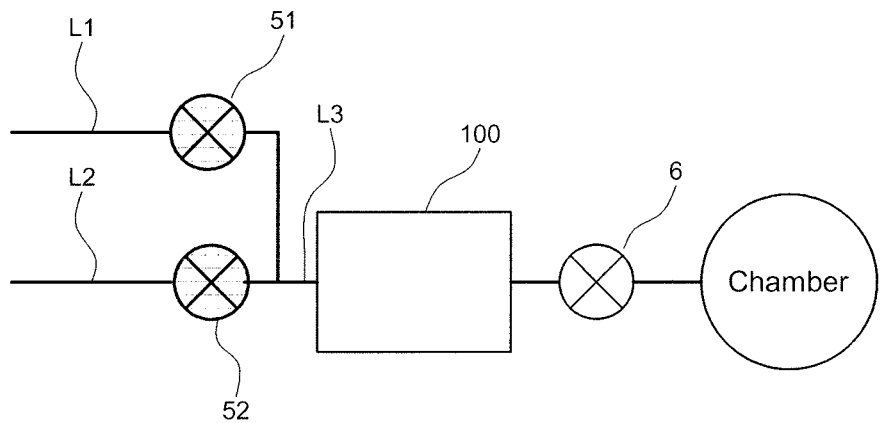

For example, as shown in FIG. 8, in the case where a line for introducing gases into the mass flow controller 100 includes a nitrogen gas line L1 for introducing a nitrogen gas, a component gas line L2 for introducing a component gas and a post-joined line L3, which is a line after the nitrogen gas line L1 and the component gas line L2, joins and is connected to the mass flow controller 100, the diagnosis may be started by closing on-off valves 51 and 52 provided on the nitrogen gas line L1 and the component gas line L2, respectively. The operation at the time of diagnosis in the configuration like this is described below. In the case of performing the diagnosis using the nitrogen gas, first the on-off valve 52 on the component gas line L2 is previously closed while the on-off valve 51 on the nitrogen gas line L1 is released, and the component gas in the mass flow controller 100 is purged. Next, the on-off valve 51 on the nitrogen gas line L1 is closed so as to keep from introducing the nitrogen gas and the diagnosis of the mass flow controller 100 is started. Herein, the operation of the flow rate control valve 3 of the mass flow controller 100 may be performed similarly to the proceeding embodiment.

Figure 9:
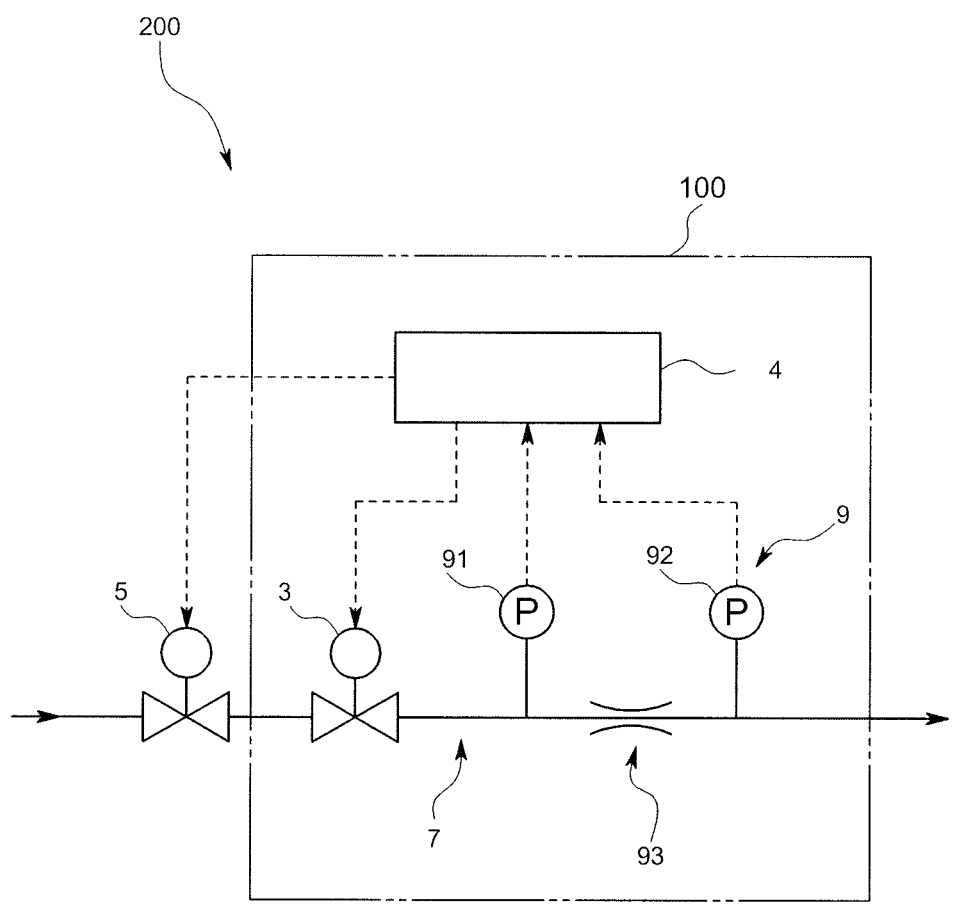
FIG. 9 is a schematic diagram showing an application example of a diagnostic mechanism according to another embodiment of the present invention.
Figure 10:
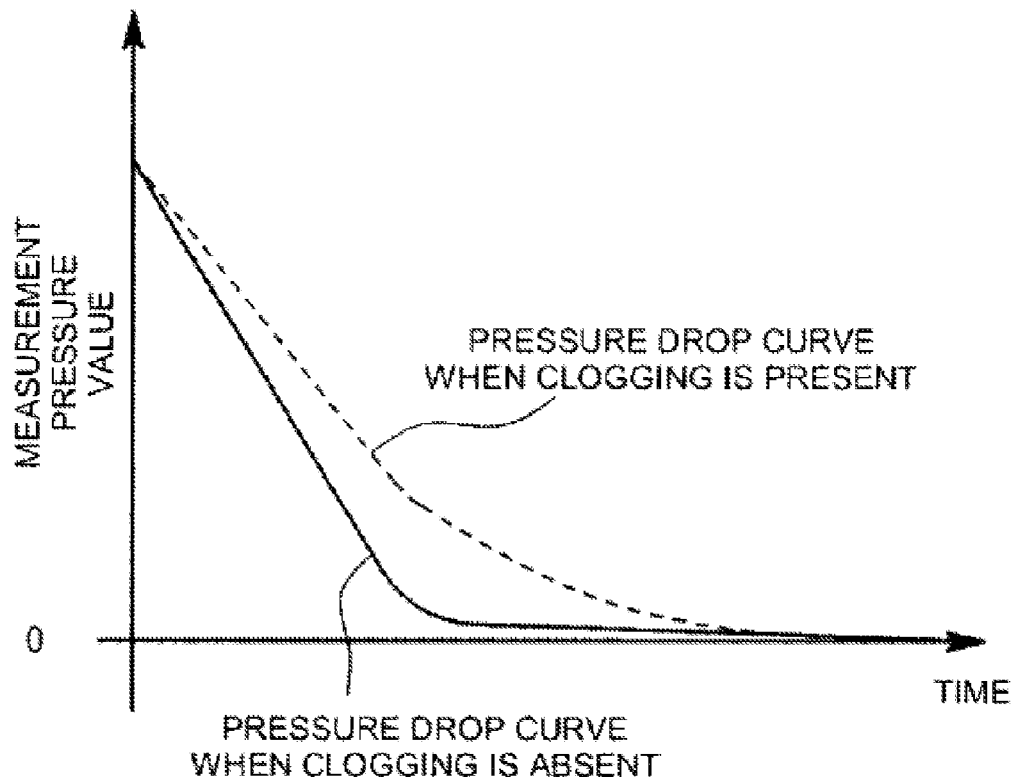
FIG. 10 is a conceptual graph view showing a conventional diagnosing method of a clogging based on a pressure reduction amount.

Also, in the above embodiment, although the diagnostic mechanism 200 is adapted to diagnose the thermal flow rate sensor and the mass flow controller using the same, it may be adapted to diagnose, for example, a differential pressure type flow rate sensor 9 and the mass flow controller 100 using the same as shown in FIG. 9. More specifically, the mass flow controller 100 includes a flow rate control valve 3 and a differential pressure type flow rate sensor 9 in this order from the upstream of the main flow passage 7. An on-off valve 5 is provided in a front stair of the mass flow controller 100 that includes a control mechanism 4 for performing various operations, etc. related to the control and diagnosis of the flow rate control valve 3 and the first on-off valve 5. Referring to the differential pressure type flow rate sensor 9 in detail, a first pressure sensor 91 and a second pressure sensor 92 are respectively provided before and after a fluid resistor member 93, and a differential pressure caused by the fluid resistor member 93 is measured by the first and second pressure sensors 91 and 92 so that a flow rate of the fluid flowing in the main flow passage 7 is measured based on the differential pressure. Also in this embodiment, the diagnosis as to, e.g., whether a clogging is present or not in the main flow passage 7 is performed using the same diagnostic algorithms as in the proceeding embodiment. With this configuration, the diagnosis of the flow rate sensor, etc. can be accurately performed using the simple algorithms. Moreover, the diagnostic mechanism of the present invention is not intended to diagnose only a flow rate sensor provided in the mass flow controller but it may be configured to diagnose, e.g., a single unit of a flow rate sensor provided on a piping. In addition, regarding, e.g., an abnormality related to the flow rate sensor, it means not only a clogging of a flow passage provided with the flow rate sensor as in the above embodiment but also a concept including an abnormality caused in a piping to which equipment constituting the flow rate sensor is connected and should not be limited to the abnormality described in the above embodiment.

In the diagnostic mechanism of the above embodiment, although the measurement flow rate value is used as it is to calculate an inspection value so as to perform a diagnosis of presence or absence of a clogging, the inspection value may be calculated based on a pressure measurement value outputted from the pressure sensor on the premise that the measurement flow rate value is corrected. In recent years, in order to correct a flow rate measurement error or a flow rate control error based on transient or static changes in pressure, there has been known a fluid flow rate measuring device or a flow rate measuring device provided with a pressure sensor for measuring a pressure of the fluid. With this configuration, a pressure sensor provided in advance is used also at the time of diagnosing so that the measurement error due to a pressure drop not only at the time of normal measurement or flow rate control but also at the time of diagnosing can be eliminated from the measurement flow rate value. Thus, it becomes possible to extract only the effect due to a clogging so that the diagnosis can be performed more accurately.

In addition, the measurement flow rate value may be corrected based on a temperature of the fluid. For example, a temperature sensor for measuring a temperature of the fluid and outputting the measurement temperature may be further provided, or measurement of a temperature may be performed using an output of a heat-sensitive resistor in the thermal flow rate sensor. Thus, even though the initial conditions such as a pressure and a temperature at the time of starting a diagnosis are not strictly defined, the diagnosis can be performed in terms of applicable criteria so as to be able to improve the diagnostic accuracy.

Moreover, the method of detecting an expiration point of the diagnostic period is performed not only based on whether or not there occurs an error between the target flow rate value and the measurement flow rate value but also may be determined based on the opening degree of the flow rate control valve. For example, it may be configured to detect the opening degree of the flow rate control valve per se so that the expiration of the diagnostic period may be detected at the time of full opening thereof, or in case of a solenoid valve, etc., it may be configured to determine the expiration of the diagnostic period based on the fact that the voltage inputted to the valve becomes 100%.

Since the inspection value output part may be configured to set at least a part of the period from a time point of closing the flow passage upstream of the flow rate sensor to a time point of expiration of the state that the measurement flow rate value and the target flow rate value are substantially nearly equal to each other, for example, a starting point of the diagnostic period may be set by a time point after a predetermined elapsed time from a time point of closing the flow passage upstream of the flow rate sensor.

In addition, the inspection value output part may be configured to maintain the state that the measurement flow rate value and the target flow rate value are substantially nearly equal to each other and to output the inspection value that is a value related to a time integral of the measurement flow rate value during the diagnostic period with use of the period up to the time point when the opening degree of the flow rate control valve becomes coincident with the expiration opening degree of the diagnosis as the diagnostic period.

Moreover, the flow passage may be closed by an on-off valve positioned upstream of the flow rate sensor or may be closed by a flow rate control valve controllable of an opening degree thereof. In this case, when the flow passage is released again after the diagnostic period expires, the opening degree of the flow rate control valve may be fully opened or may be opened by a predetermined opening degree.

In the above embodiment, although the flow rate integration value is used as the inspection value, the other may be used so long as a value related to a time integral of the measurement flow rate value. For example, the inspection value may be a length (elapsed time) of the diagnostic period. Even with such a configuration, as explained in the above embodiment, it has a specific feature that the inspection value is reduced to be small when the sensor flow passage is clogged and the inspection value is increased to be large when the main flow passage is clogged. Therefore, it is possible to diagnose which of the flow passages is clogged. In addition, although the target flow rate value is always constant in the diagnostic period, the target flow rate value may be varied with time lapse. Also, in this case, the diagnosis can be performed by calculating the flow rate integration value to be used as the inspection value from the measurement flow rate with respect to a duration from a time point of starting the diagnostic period to a time point when the flow rate control by the flow rate control valve becomes unable.

Moreover, in the above embodiment, the inspection value is the flow rate integration value calculated in the normal condition, other values may be used as the inspection value. For example, the flow rate integration value in the normal condition may be added or multiplied by a predetermined value to be used as the inspection value. In short, a value representing an amount between the inspection value when the main flow passage is clogged and the inspection value when the sensor flow passage is clogged may be set as the inspection value.

When starting a diagnosis, although the first on-off valve is fully closed in the above embodiment, the full closing may be performed by a valve, etc. provided upstream of the flow rate measurement sensor and the flow rate control valve.

In addition, the embodiments of the present invention may be combined and various changes and modifications can be made within the scope of the present invention unless departing from the intended spirit thereof.

INDUSTRIAL APPLICABILITY

According to the diagnostic mechanism of the present invention, an abnormality of a flow rate sensor and a flow passage can be accurately diagnosed with use of simple algorithms.

REFERENCE CHARACTERS LIST

200 . . . Diagnostic mechanism
2 . . . Thermal flow rate sensor (flow rate sensor)
3 . . . Flow rate control valve
41 . . . Flow rate control part
42 . . . Inspection value output part
43 . . . Diagnosing part
7 . . . Main flow passage (flow passage)
8 . . . Sensor flow passage (flow passage)
9 . . . Differential pressure type flow rate sensor

The invention claimed is:

1. A diagnostic mechanism adapted to diagnose an abnormality relating to a flow rate sensor for measuring a flow rate of a fluid flowing in a flow passage, the diagnostic mechanism comprising:
a flow rate control part configured to control an opening degree of a flow rate control valve provided in the flow passage so that a measurement flow rate value outputted from the flow rate sensor becomes a target flow rate value, wherein the target flow rate value is a value used for a calculation in order to control the opening degree of the flow rate control valve;
an inspection value output part configured to output an inspection value related to a time integral of the measurement flow rate value in a diagnostic period which is defined as starting on or after a time point at which the flow passage is closed upstream of the flow rate sensor and as expiring after the time point at which the flow passage is closed and on or before a time point at which the measurement flow rate value and the target flow rate value cease to be substantially nearly equal; and
a diagnosing part configured to compare the inspection value and a predetermined specified value so as to diagnose whether an abnormality relating to the flow rate sensor is present or not.

2. The diagnostic mechanism according to claim 1, wherein the flow passage includes a main flow passage and a sensor flow passage which branches from the main flow passage and joins the main flow passage again and wherein the flow rate sensor is a thermal flow rate sensor which is provided with a flow rate measuring mechanism in the sensor flow passage for measuring a flow rate of the fluid.

3. The diagnostic mechanism according to claim 2, wherein the diagnosing part is configured such that, in a case where the inspection value is larger than the specified value, the diagnosing part diagnoses that an abnormality is present due to a clogging of the main flow passage, and in a case where the inspection value is smaller than the specified value, the diagnosing part diagnoses that an abnormality is present due to a clogging of the sensor flow passage.

4. The diagnostic mechanism according to claim 1, wherein the flow rate sensor is a differential pressure type flow rate sensor.

5. The diagnostic mechanism according to claim 1, wherein the inspection value is a flow rate integration value obtained by time-integrating the measurement flow rate value during the diagnostic period.

6. The diagnostic mechanism according to claim 1, wherein the inspection value is a length of the diagnostic period.

7. The diagnostic mechanism according to claim 1, wherein the inspection value output part is configured to detect an end point of the diagnostic period based on an error between the measurement flow rate value and the target flow rate value.

8. The diagnostic mechanism according to claim 1, wherein the inspection value output part is configured to detect an end point of the diagnostic period based on a fact that the opening degree of the flow rate control valve becomes a full opening or a predetermined opening degree of a diagnosis expiration.

9. The diagnostic mechanism according to claim 8, wherein the opening degree of the diagnosis expiration is an opening degree smaller than a full-opening degree of the flow rate control valve by a predetermined amount.

10. The diagnostic mechanism according to claim 8, wherein the inspection value output part is adapted to be able to control a valve provided upstream of the flow rate sensor, and wherein the inspection value output part is adapted to release the valve provided upstream of the flow rate sensor at a time when the opening degree of the flow rate control valve becomes the opening degree of the diagnosis expiration.

11. The diagnostic mechanism according to claim 1 further comprising a pressure sensor configured to measure a pressure of the fluid and outputting a measurement pressure value, wherein the inspection value output part is so configured as to correct the inspection value based on the measurement pressure value.

12. The diagnostic mechanism according to claim 1 further comprising a temperature sensor for measuring a temperature of the fluid and outputting a measurement value of the temperature, wherein the inspection value output part is so configured as to correct the inspection value based on the measurement value of the temperature.

13. The diagnostic mechanism according to claim 1, wherein the specified value is the inspection value outputted by the inspection value output part when a measurement output value of the flow rate sensor is normal.

* * * * *